UNITED STATES PATENT OFFICE.

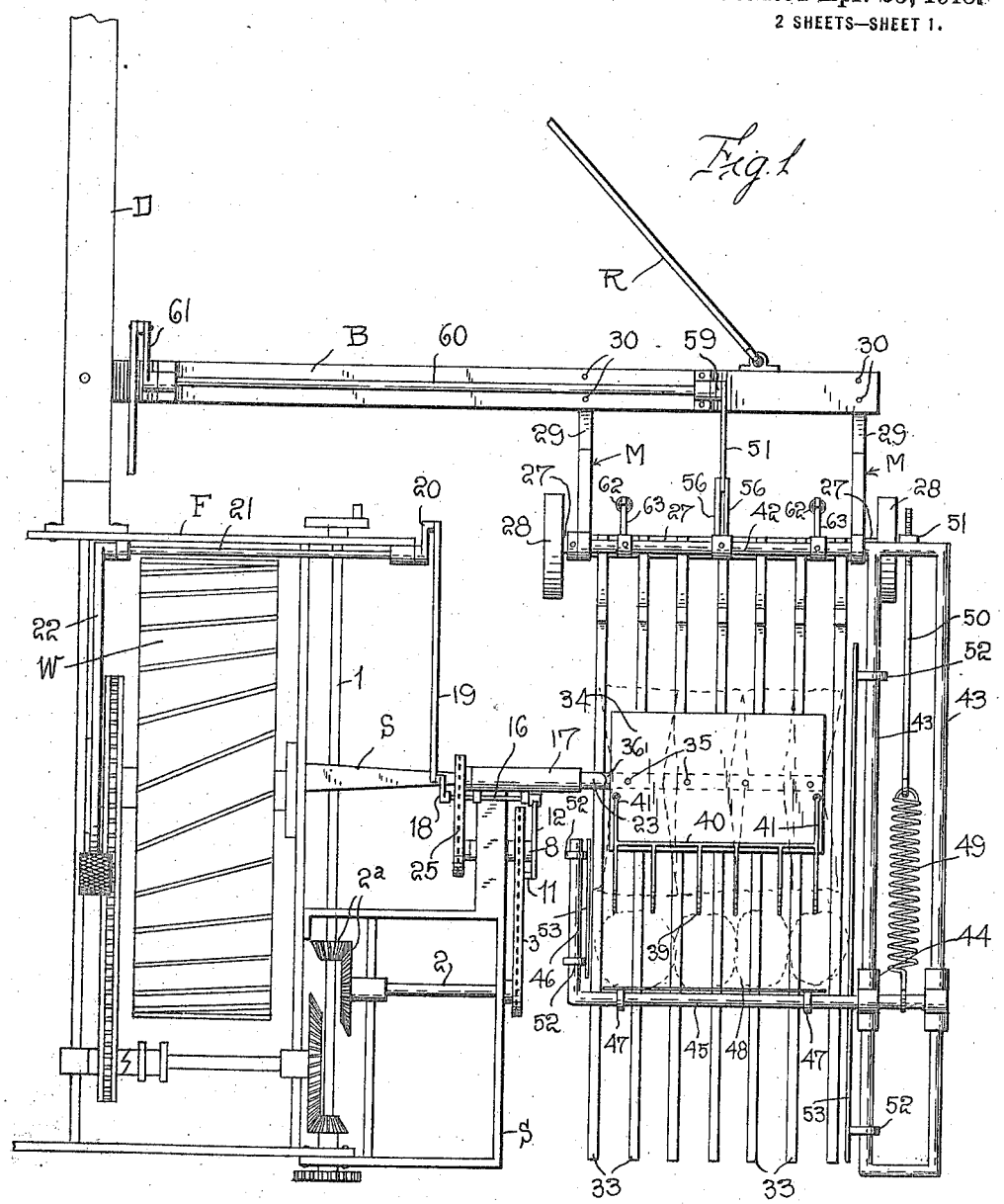

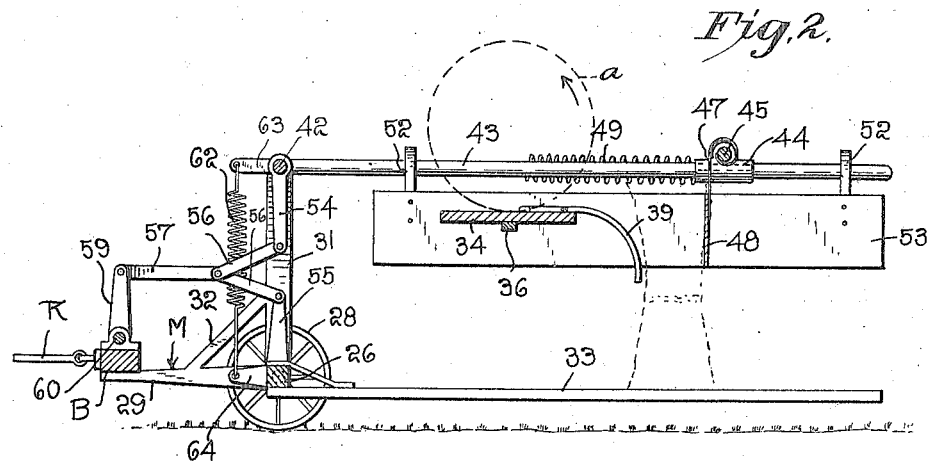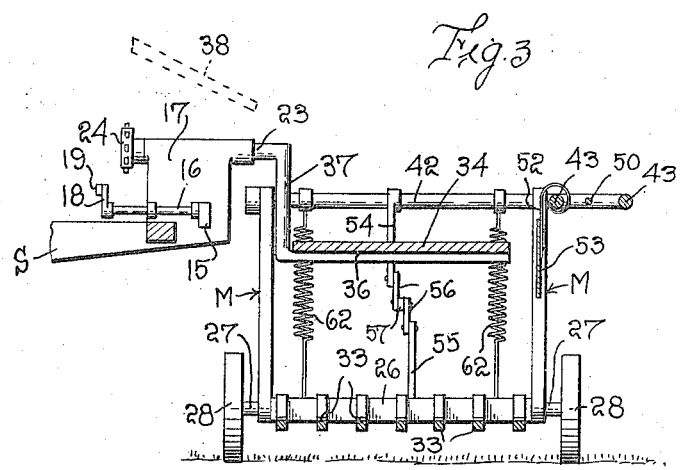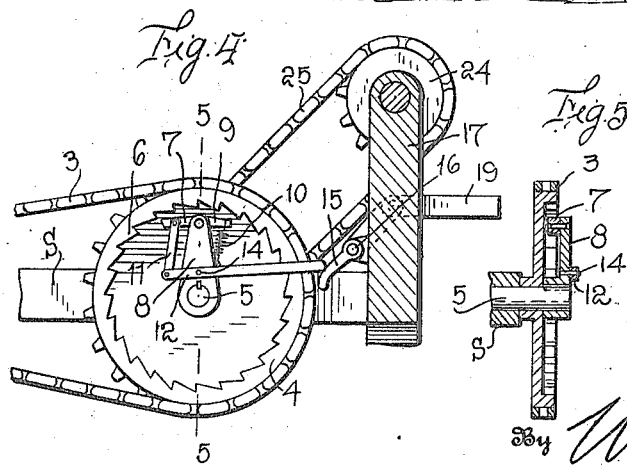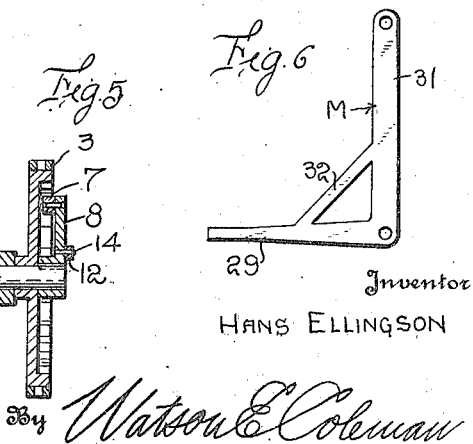

HANS ELLINGSON, OF ARROW CREEK, MONTANA.

GRAIN-SHOCKER.

1,263,540.

Specification of Letters Patent. Patented Apr. 23, 1918.

Application filed November 12, 1917. Serial No. 201,558.

*To all whom it may concern:*

Be it known that I, HANS ELLINGSON, a citizen of the United States, residing at Arrow Creek, in the county of Fergus and State of Montana, have invented certain new and useful Improvements in Grain-Shockers, of which the following is a specification, reference being had to the accompanying drawings.

This invention relates to certain improvements in grain shockers and has relation more particularly to a device of this general character which is adapted to be attached to a grain harvesting machine, such as a self binder, and to receive the sheaves or bundles from the harvesting machine and to deposit said bundles or sheaves in a shock upon the ground during the movement of the shocker and harvester.

And it is an object of the invention to provide a novel and improved device of this general character including a bundle or sheaf receiving cradle mounted for rotary movement which operates to deposit the sheaves or bundles as delivered from the harvesting machine upon a carrier or shock receptacle to form a shock.

It is also an object of the invention to provide a device of this general character having novel and improved means whereby a shock formed on the carrier or shock receptacle may be readily and conveniently deposited upon the ground.

The invention consists in the details of construction and in the combination and arrangement of the several parts of my improved grain shocker wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein:

Figure 1 is a view in top plan of a grain shocker constructed in accordance with an embodiment of my invention, the co-acting portion of the harvesting machine or binder being shown in fragment and with parts omitted;

Fig. 2 is a longitudinal sectional view taken through my improved grain shocker as herein embodied;

Fig. 3 is a transverse sectional view taken through my improved shocker, a fragment of a binder chute or deck being indicated by dotted lines;

Fig. 4 is an enlarged fragmentary view partly in elevation and partly in section illustrating the mechanism for controlling the movement of the cradle as herein embodied;

Fig. 5 is a sectional view taken substantially on the line 5—5 of Fig. 4; and

Fig. 6 is a view in elevation of one of the supporting members as herein employed detached.

As disclosed in the accompanying drawings, I denotes a sickle driving shaft of a self binder adapted to be driven in a conventional manner by the bull wheel W and which shaft is rotatably supported in a well known manner by the binder frame F. S denotes a supplemental frame suitably secured to the frame F and which rotatably supports a transversely directed shaft 2 operatively engaged as at $2^a$ with the shaft 1. Operatively engaged with the shaft 2 is a sprocket chain 3 which is also operatively engaged with a sprocket wheel 4 loosely mounted upon an end portion of the short shaft 5 rotatably supported by the frame F and disposed in parallelism with the shaft 2 hereinbefore referred to. The wheel 4 is also provided with an annular series of internal ratchet teeth 6 with which is adapted to engage a dog 7 pivotally engaged with the outer end portion of a rock arm 8 keyed or otherwise fixed to the shaft 5. The dog 7 is provided with the tail 9 and interposed between said tail 9 and the rock arm 8 is a retractile member 10 herein disclosed as a conventional coil spring which serves to constantly urge the outer or free end portion of the dog 7 into operative engagement with the teeth 6. Pivotally engaged with the dog 7 at a predetermined point inwardly of its outer or free end is a link 11 which is also pivotally engaged with a lever 12 pivotally engaged at a predetermined point intermediate its length as at 14 with the rock arm 8. The opposite end portion of the lever 12 extends within the path of travel of a rock arm or finger 15 carried by a rock shaft 16 rotatably supported by an upstanding block or head 17 comprised in the structure of the supplemental frame S. The shaft 16 is provided with a crank 18 with which is operatively engaged a pitman 19 also operatively engaged with a crank 20 carried by a shaft 21 rotatably mounted upon the frame F. Operatively engaged with the shaft 20 is a foot lever or pedal 22. The arm or finger 15 normally contacts from below with the end portion of the lever 12 remote from the link 11 and serves to maintain the dog 7 out of engagement with the ratchet teeth 6 whereupon the sprocket wheel 4 rotates freely about the shaft 5. Upon depression of the foot lever or pedal 22 the finger or arm 15 is swung downwardly away from the lever 12 whereupon the retractile member 10 serves to throw the dog 7 into operative engagement with a tooth 6 so that the sprocket wheel 4 will rotate with the shaft 5 until the sprocket wheel 4 has completed a single revolution whereupon the lever 12 will contact with the arm or finger 15 which results in the dog 7 being thrown out of operative engagement with the sprocket wheel 4. As any means may be employed for returning the arm or finger 15 to its normal position a detailed description and illustration thereof has been omitted as being unnecessary.

Rotatably supported by the upstanding head or block 17 is a shaft 23 provided in its outer end portion with a sprocket 24 around which is disposed a chain 25 also operatively engaged with the shaft 5 whereby it will be perceived that the shaft 23 will be caused to rotate in unison with the shaft 5.

D indicates a draft pole or tongue suitably secured to the frame F and extending laterally from the pole or tongue D is a beam B, said beam being of such a length as to terminate a predetermined distance beyond the supplemental frame S. R denotes a brace rod adapted to be interposed between the outer end portion of the beam B and the forward end portion of the pole or tongue D for a purpose which is believed to be clearly apparent to those skilled in the art to which my invention pertains.

26 denotes an elongated member provided at its opposite ends with the trunnions 27 upon which are mounted the ground engaging wheels 28. Also mounted upon each of the trunnions 27 is the heel portion of a substantially L-shaped member M. The foot or lower arm 29 of the member M is forwardly directed and substantially horizontal and has its outer or free end portion suitably engaged as at 30 with the beam B, whereby it will be perceived that an operative connection is had between the beam B and the elongated member 26. Interposed between the lower or horizontal arm or foot 29 and the stem or vertical arm 31 of the member M is a bracing arm 32.

Secured to the elongated member 26 and extending rearwardly therefrom are the substantially straight tines 33 of predetermined length and preferably arranged in parallelism. Overlying the tines 33 at substantially midway the length thereof is a flat bundle or sheaf cradle 34 disposed transversely of the tines 33 and suitably anchored as at 35 to the arm 36 carried by the outer end portion of the crank or rock arm 37 carried by the outer end portion of the shaft 23. It is preferred that the arm 36, the crank or rock arm 37 and the shaft 23 be integral although I do not wish to be understood as limiting myself in this respect.

The bundles or sheaves as discharged from the binder over the chute or deck 38 (indicated by dotted lines in fragment in figure 3) are deposited upon the cradle 34 with the butts of the stalks forwardly directed and when the requisite number of bundles or sheaves have been delivered upon the cradle 34 the operator depresses the pedal or lever 22 which results in a single revolution of the shaft 23. Upon a single revolution of the shaft 23, the cradle 34 will swing in a complete circle in the direction indicated by the arrow in Fig. 2 with the center of the cradle traveling in the path indicated by the dotted line $a$ in said Fig. 2. Normally the cradle 34 is in its lowermost position and its initial swinging movement is in a direction away from the forward end of the tines 33. Upon the initial swinging movement of the cradle 34 said cradle will be inclined transversely as to cause the bundles or sheaves to slide downwardly. Upon initial swinging movement of the cradle 34, the sheaves or bundles resting thereon are carried toward the rear or free ends of the tines 33 a distance dependent upon the length of the arm or crank 37. When the cradle 34 has moved substantially 45° the bundles or sheaves will begin to slide therefrom with the butt ends downwardly disposed and as the cradle rises the butt ends of the bundles or sheaves will engage the tines 33. After the cradle 34 has moved upwardly above the sheaves, the heads of said sheaves will fall against the back board 48. As the cradle 34 begins to swing downwardly the spring arms or tines 39 extending beyond a marginal portion thereof will engage the butt ends of the bundles or sheaves and force the same rearwardly of the tines 33 and thereby cause the sheaves or bundles to assume substantially an upright position as indicated by dotted lines in Fig. 2. The spring arms or tines 39 as herein disclosed are carried by the bar 40 provided at its extremities with the inwardly directed extremities 41 which are suitably secured to the bundle or sheaf receiving face of the cradle 34. The arms or tines 39 extend, when the cradle 34 is in its lower horizontal position, rearwardly therefrom and downwardly on a predetermined curvature. Disposed transversely of my improved shocker and supported by the upper end portion of the stems or vertical arms or members 31 is a rock shaft 42 provided at one end with the rearwardly directed elongated members 43 arranged in parallelism and terminating in close proximity to the free end portions of the tines 33. Slidably mounted upon the members 43 are the sleeves 44 to which is suitably secured the transversely disposed elongated member 45 extending across the rear or free end portions of the tines 33 and terminating in a forwardly directed extension 46. Suitably secured to the transverse member 45 are the depending spring arms 47 to the lower or free end portions of which is secured the board 48 against which the sheaves or bundles are adapted to rest. It will be perceived that after the first group of bundles or sheaves have been engaged with the board 48 the second set of bundles or sheaves assembled by the cradle 34 will result in a rearward movement of the board 48 as permitted by the sliding sleeves 44. The sleeves 44 are constantly urged toward the front of my improved shocker through the medium of a retractile member 49 herein disclosed as a conventional coil spring suitably anchored at one end to the member 45 at a point intermediate the parallel elongated members 43 and having its opposite end suitably anchored to an elongated shank 50 loosely disposed through the rock shaft 42 at a point intermediate the parallel members 43 and threaded upon the end portion of said shank 50 and coacting with the shaft 42 is the holding nut 51 which also affords means whereby the tension of the retractile member 49 may be regulated. Depending from the inner elongated member 43 and from the extension 46 are the spring arms 52 which have secured thereto the side boards 53 to facilitate the forming of a shock.

Depending from the rock shaft 42 is a rock arm 54 and extending upward from the member 26 is a rock arm 55. Pivotally engaged with the free extremities of the arms 54 and 55 are the links 56 which are also pivotally engaged with a link 57 common to both. The forward end portion of the link 57 is pivotally engaged with an upstanding rock arm 59 carried by a rock shaft 60 disposed longitudinally of and rotatably supported by the beam B. Suitable means as indicated at 61 are employed for imparting rocking movement to the shaft 60. When a sufficient number of bundles or sheaves have been arranged in shock formation upon the tines 33 and it is desired to discharge the shock upon the ground the shaft 60 is rocked which results in an elevation or upward swing of the elongated members 43 and their concomitant parts and a depression or downward swinging movement of the tines 33. This relative separation of the members 43 and their concomitant parts and the tines 33 permit an unobstructed delivery of the shock upon the ground as the tines 33 will pass from beneath the shock as the machine travels forwardly. The movements of the elongated members 43 and the tines 33 is materially expedited by the retractile members 62 interposed between the rock shaft 42 and the member 26. As is particularly illustrated in Fig. 2 each of the members 62 is secured at one end to a forwardly directed rock arm 63 carried by the shaft 42 and a forwardly directed arm 64 carried by the member 26. It is also preferred that the retractile members 62, which are herein disclosed as conventional coil springs, be of sufficient tension as to automatically impart separating swinging movement to the members 43 and their concomitant parts and the tines 33 upon release of the shaft 60. The shaft 60 is normally held against rocking movement in any suitable manner such as a conventional latch mechanism, (not shown) and preferably comprised in connection with a lever construction included in the operating means generally indicated at 61. Upon requisite rotation of the shaft 60 the members 43 of the tines 33 will be returned to operative positions.

From the foregoing description, it is thought to be obvious that a grain shocker constructed in accordance with my invention is particularly well adapted for use by reason of the convenience and facility with which it may be assembled and operated and it will also be obvious that my invention is susceptible of some change and modification without materially departing from the principles and spirit thereof and for this reason I do not wish to be understood as limiting myself to the precise arrangement and formation of the several parts herein shown in carrying out my invention in practice except as hereinafter claimed.

I claim:

1. A grain shocker comprising a carrier, a bundle receiving cradle positioned above the carrier and mounted for swinging movement in a circular path in a vertical direction, and means for swinging the cradle in a complete circle, said cradle being normally substantially horizontal and at its lowermost position.

2. A grain shocker comprising a carrier, a bundle receiving cradle positioned above the carrier and mounted for swinging movement in a circular path in a vertical direction, means for swinging the cradle in a complete circle, said cradle being normally substantially horizontal and at its lowermost position to the cradle, and a backboard disposed transversely of the carrier at a point rearwardly of the cradle, said backboard being capable of movement in a direction away from the cradle.

3. A grain shocker comprising a carrier, a bundle receiving cradle positioned above the carrier and mounted for swinging movement in a circular path in a vertical direction, means for imparting movement to the cradle, a backboard disposed transversely of the carrier at a point rearwardly of the cradle, and means for constantly urging the backboard in a direction toward the cradle.

4. A grain shocker comprising a carrier, a bundle receiving cradle positioned above the carrier and mounted for swinging movement in a circular path in a vertical direction, means for imparting movement to the cradle, a backboard disposed transversely of the carrier at a point rearwardly of the cradle, said backboard being mounted for movement longitudinally of the carrier.

5. A grain shocker comprising a carrier, a bundle receiving cradle positioned above the carrier and mounted for swinging movement in a circular path in a vertical direction, and means for swinging the cradle in a complete circle, said cradle being normally substantially horizontal and at its lowermost position, said cradle initially traveling rearwardly and upwardly.

6. A grain shocker comprising a carrier, a bundle receiving cradle positioned above the carrier and mounted for swinging movement in a circular path in a vertical direction, means for imparting movement to the cradle, a backboard disposed transversely of the carrier at a point rearwardly of the cradle, said backboard being mounted for movement longitudinally of the carrier, and means for imparting movement simultaneously to the carrier and the backboard but in reverse directions.

7. A grain shocker comprising a carrier, a bundle receiving cradle positioned above the carrier and mounted for swinging movement in a circular path in a vertical direction, means for imparting movement to the cradle, a backboard supported above the carrier and rearwardly of the cradle and movable longitudinally of the carrier and side boards positioned above the carrier.

8. A shock former including a carrier, a shaft mounted for rotary movement, means for imparting a complete revolution to the shaft, said shaft being provided with an offset portion overlying the carrier, a bundle receiving cradle carried by said offset portion, and a back board supported above the carrier and rearwardly of the cradle and mounted for movement longitudinally of the carrier, and means for urging the back board in a direction toward the cradle.

9. A grain shocker comprising a carrier, a bundle receiving cradle positioned above the carrier and mounted for swinging movement in a circular path in a vertical direction, means for moving the cradle vertically in a complete circle, and resilient arms carried by and extending beyond the rear marginal portion of the cradle when the cradle is in its lowermost position, the initial travel of the cradle being upwardly and rearwardly.

10. A grain shocker comprising a carrier, a bundle receiving cradle positioned above the carrier and mounted for swinging movement in a circular path in a vertical direction, means for causing the cradle to move in a complete circle, a rearwardly disposed elongated member positioned above the carrier and adjacent a longitudinal margin thereof, a back board disposed above and transversely of the carrier and positioned rearwardly of the cradle, said back board having sliding engagement with the rearwardly directed elongated member, and means for urging the back board in a direction toward the cradle.

11. A grain shocker comprising a carrier, a bundle receiving cradle positioned above the carrier and mounted for swinging movement in a circular path in a vertical direction, means for causing the cradle to move in a complete circle, a rearwardly disposed elongated member positioned above the carrier and adjacent a longitudinal margin thereof, a second member extending transversely of the carrier, rearwardly of the cradle and having sliding engagement with the first named elongated member, and a back board depending from said second named member and having yielding connection therewith.

12. A grain shocker comprising a carrier, a bundle receiving cradle positioned above the carrier and mounted for swinging movement in a circular path in a vertical direction, means for causing the cradle to move in a complete circle, a rearwardly disposed elongated member positioned above the carrier and adjacent a longitudinal margin thereof, a second member extending transversely of the carrier, rearwardly of the cradle and having sliding engagement with the first named elongated member, a back board depending from said second named member and having yielding connection therewith, an end of the second named member remote from the first named member being provided with a forwardly directed extension, and side boards depending from the first named member and the forwardly directed extension of the second named member.

13. A grain shocker comprising a carrier, a bundle receiving cradle positioned above the carrier and mounted for swinging movement in a circular path in a vertical direction, means for causing the cradle to move in a complete circle, a rearwardly disposed elongated member positioned above the carrier and adjacent a longitudinal margin thereof, a second member extending transversely of the carrier, rearwardly of the cradle and having sliding engagement with the first named elongated member, a back board depending from said second named member and having yielding connection therewith, an end of the second named member remote from the first named member being provided with a forwardly directed extension, and side boards depending from the first named member and the forwardly directed extension of the second named member, said side boards having yielding movement transversely of the carrier.

In testimony whereof I hereunto affix my signature in the presence of two witnesses.

HANS ELLINGSON.

Witnesses:
WILLIAM E. KNOTT,
F. E. SMITH.

Copies of this patent may be obtained for five cents each, by addressing the "Commissioner of Patents, Washington, D. C."